(12) United States Patent
Shiomi et al.

(10) Patent No.: US 6,282,487 B1
(45) Date of Patent: Aug. 28, 2001

(54) RUNWAY RESERVATION SYSTEM

(75) Inventors: Kakuichi Shiomi, Kokubunji; Yasuhiro Katsuyama, Kawasaki; Toshikazu Nakajima, Tokyo, all of (JP)

(73) Assignees: Director-General, Ship Research Institute, Ministry of Trans, Tokyo; Kabushiki Kaisha Toshiba, Kawasaki; Oki Electric Industry Co., Ltd., Tokyo, all of (JP)

( * ) Notice: Subject to any disclaimer, the term of this patent is extended or adjusted under 35 U.S.C. 154(b) by 0 days.

(21) Appl. No.: 09/092,642

(22) Filed: Jun. 9, 1998

(30) Foreign Application Priority Data

Jun. 9, 1997 (JP) .................................................... 9-151129

(51) Int. Cl.[7] .............................. G06F 7/00; G06F 17/00; G06F 19/00
(52) U.S. Cl. ............................ 701/120; 701/13; 701/117; 701/204; 701/300; 340/947; 340/951–935; 342/32; 342/36; 342/37; 342/39
(58) Field of Search ................................... 701/120, 117, 701/300, 13, 204; 340/947, 951, 952, 953–955; 342/37, 32, 36, 39

(56) References Cited

U.S. PATENT DOCUMENTS

| | | | |
|---|---|---|---|
| 4,521,857 | * 6/1985 | Reynolds, III | 364/439 |
| 4,827,419 | * 5/1989 | Selby, III | 364/443 |
| 5,111,400 | * 5/1992 | Yoder | 364/424.01 |
| 5,265,023 | * 11/1993 | Sokkappa | 364/439 |
| 5,351,194 | * 9/1994 | Ross et al. | 364/449 |
| 5,798,726 | * 8/1998 | Schuchman et al. | 342/37 |
| 5,987,377 | * 11/1999 | Westerlage et al. | 701/204 |
| 6,006,158 | * 12/1999 | Pilley et al. | 701/129 |
| 6,044,323 | * 3/2000 | Yee et al. | 701/120 |

* cited by examiner

Primary Examiner—William A. Cuchlinski, Jr.
Assistant Examiner—Ronnie Mancho
(74) Attorney, Agent, or Firm—Oblon, Spivak, McClelland, Maier & Neustadt, P.C.

(57) ABSTRACT

Weather information is stored in a weather information storage unit. Information of aircraft flight situation, flight plan, air traffic flow management, and condition status is stored in an aircraft information storage unit. On the basis of information stored in the weather information storage unit and the aircraft information storage unit, arrival time of each arriving aircraft and departing aircraft is predicted by an arrival time prediction unit and a departure time prediction unit. The information of the estimated time thus predicted is stored in an estimated time of takeoff and landing storage unit. On the other hand, on the basis of information stored in information storage units, runway use time is assigned to each arriving aircraft and departing aircraft by a takeoff and landing assignment unit in accordance with Control System Standards. Runway reservation information thus obtained is stored in a reservation information storage unit. The information stored in the reservation information storage unit is displayed on a screen by a reservation display unit. The information stored in the estimated time of takeoff and landing storage unit is suitably displayed on the screen by a flight situation display unit.

20 Claims, 6 Drawing Sheets

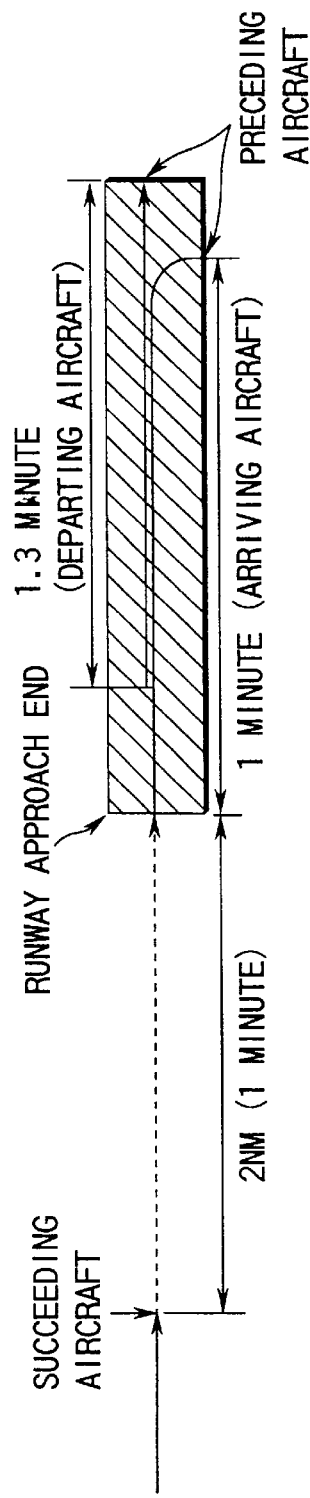

RUNWAY RESERVATION SYSTEM

BACKGROUND OF THE INVENTION

The present invention relates to a runway reservation system for predicting the time of taking off and landing of aircraft expected to arrive and depart, assigning runway use time to each of the aircraft expected to arrive and depart so as to exhibit the processing capability of the airport at its maximum, and supporting the terminal control and the aerodrome control service.

As it is well known, in the terminal control, the sequence and spacing of arriving aircraft are established by watching the radar screen or the like. On the other hand, in the tower control, control is affected so that departing aircraft may take off in between the spacing of arriving aircraft by watching the radar screen in the terminal control. As occasion demands, adjustment of taking off and landing is coordinated between the terminal control and the tower control by means of audio communication over a land line.

For improving the service efficiency of departing aircraft and arriving aircraft in total in the conventional aerodrome control, it is thus necessary to conjecture an efficient pattern of taking off and landing and conduct adjustment of taking off and landing between the terminal control and the tower control by means of audio communication in order to implement this pattern of taking off and landing.

Nowadays, however, the aircraft schedule has become more and more overcrowded, and the service of controllers has arrived at its overload. Under the existing circumstances, adjustment of taking off and landing allowing such taking off and landing as to exhibit the processing capability of the airport at its maximum is very difficult.

As for situations of overload of the service of controllers, the following cases described in (1) to (3) can be considered.

(1) The case where a runway change is conducted:

In Japan, there are many airports located in the vicinity of the sea. During one day, therefore, the runway change is conducted typically twice. For example, in the Tokyo International Airport and Nagoya Airport, the wind shifts from a sea breeze to a land breeze and from a land breeze to a sea breeze just before noon and in the evening.

If a runway change has been conducted according to such a wind shift, then a changeover must be conducted from a series of familiar control works to a thinking pattern after the runway change, and immediate adaptation is demanded. As a result, a work load occurs.

(2) The case where the approach distance is long:

The approach of the Kansai International Airport passing through the Akashi Arrival and Lilac Arrival has a narrow airspace width and a long section. Therefore, it is necessary to make a large number of aircraft fly at equal intervals, and the load of the control service becomes especially heavy.

(3) The case where the approach distance is short:

If the approach distance is short as in each north arrival of the Narita Airport or the Eddy Arrival in the Kansai International Airport, then the spatial margin for establishing the sequence and spacing of arriving aircraft is insufficient and the control needs to be conducted in a short time. Temporarily, therefore, the service load is increased.

BRIEF SUMMARY OF THE INVENTION

For improving the efficiency of taking off and landing in the conventional aerodrome control, it is necessary as heretofore described to conjecture an efficient pattern of taking off and landing and conduct adjustment of taking off and landing between the terminal control and the tower control by means of audio communication.

Under the existing circumstances, such conjecture of an efficient pattern of taking off and landing relies on the experience and skill of each controller. In such a state that the control service load is high, it is difficult to exhibit the efficiency of taking off and landing at its maximum.

An object of the present invention is to provide a runway reservation system capable of solving the above described problems, predicting the time of taking off and landing of aircraft expected to arrive and depart, assigning runway use time to each of the aircraft expected to arrive and depart so as to exhibit the processing capability of the airport at its maximum, displaying the runway use time assigning information on a screen in a form that the controller can easily grasp, sharing this information between the terminal control and the aerodrome control, thereby exhibiting the processing capability of the airport at its maximum, and significantly reducing the control service load concerning the adjustment of taking off and landing.

In order to achieve the above described object, a runway reservation system for assigning runway use time to each of the arriving and departing aircraft and supporting terminal control and aerodrome control service in accordance with the present invention includes:

information acquiring means for acquiring aerodrome information and weather information of the arriving and departing aircraft;

arrival time prediction means for predicting arrival time of the arriving aircraft on the basis of information acquired by the information acquiring means;

departure time prediction means for predicting departure time of the departing aircraft on the basis of information acquired by the information acquiring means;

runway use time assignment means for assigning runway use time to each of the arriving and departing aircraft most efficiently under restrictions on the control on the basis of information acquired by the information acquiring means;

flight situation display means for displaying estimated time of arrival/departure of each of the arriving and departing aircraft calculated by the arrival time prediction means and the departure time prediction means; and reservation situation display means for displaying the situation of runway assignments calculated by the runway use time assignment means.

To be more concrete, a runway reservation system for assigning runway use time to each of the arriving and departing aircraft and supporting terminal control and aerodrome control service, includes:

a weather information receiving unit for acquiring weather information from an external system issuing weather information in an approach area and selectively taking out necessary information;

a weather information storage unit for storing weather information acquired by the weather information receiving unit and outputting pertinent weather information according to a request;

an aircraft flight information receiving unit for selectively taking necessary information out of aircraft flight information sent from a radar or each aircraft;

flight plan information receiving unit for selectively taking out information containing arriving aircraft information, estimated time of arrival, estimated time of movement start, restricted control matters, standard instrument departure, aircraft type, wake turbulence classification, and spot number from a flight plan sent from a FDP;

an ATFM information receiving unit for selectively taking out necessary information from a flow control center;

a condition status management unit for determining whether each of the arriving and departing aircraft is a subject of control and judging a state of each of the arriving and departing aircraft on the basis of contents of control instructions sent from an external control apparatus, and acquiring a condition status as a part of arriving and departing aircraft information;

an aircraft information storage unit for storing, as a part of the aircraft information of the arriving aircraft and departing aircraft, information acquired in the aircraft flight information receiving unit, the flight plan information receiving unit, the ATFM information receiving unit, and the condition status management unit, and outputting pertinent information according to a request;

an arriving time prediction unit for predicting an arrival time of the each of arriving aircraft on the basis of information stored in the weather information storage unit and the aircraft information storage unit, and outputting information of estimated time of arrival;

a departure time prediction unit for predicting departure time of each of departing aircraft on the basis of information stored in the aircraft information storage unit and outputting information of estimated time of departure;

an estimated time of takeoff and landing storage unit for storing information of estimated time of arrival and estimated time of departure respectively output from the arrival time prediction unit and the departure time prediction unit, and outputting pertinent information according to a request;

a takeoff and landing assignment unit inputted with aircraft information of arriving aircraft and departing aircraft from the aircraft information storage unit and inputted with information of estimated time of arrival and estimated time of departure from the estimated time of takeoff and landing storage unit, to assign runway use time to each of the arriving aircraft and departing aircraft in accordance with Control System Standards, and output a result of assignment as runway reservation information;

a reservation information storage unit for storing runway reservation information output from the takeoff and landing assignment unit, and outputting pertinent information according to a request;

a flight situation display unit inputted with estimated time of arrival and estimated time of departure from the estimated time of takeoff and landing storage unit and inputted with pertinent aircraft information of arriving aircraft and departing aircraft from the aircraft information storage unit, to display each information on a screen;

a reservation situation display unit inputted with runway reservation information from the reservation information storage unit and displaying the runway reservation information on the screen;

an runway associated parameter storage unit for storing predefined parameter information for each runway, and outputting the parameter information to the arrival time prediction unit, the departure time prediction unit, and the takeoff and landing assignment unit; and a runway associated parameter alteration unit inputted with runway associated parameter information from the runway associated parameter storage unit, to alter parameters on the screen, output altered parameter information to the runway associated parameter storage unit, and output runway change instruction given on the screen to the runway associated parameter storage unit.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinbefore.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 5 is a diagram for describing the Control System Standards in the airport;

FIG. 6B is a diagram showing one of the data items illustrated in FIG. 6A; and

FIG. 6C is a diagram showing another of the data items illustrated in FIG. 6A.

DETAILED DESCRIPTION OF THE INVENTION

Figure 1:
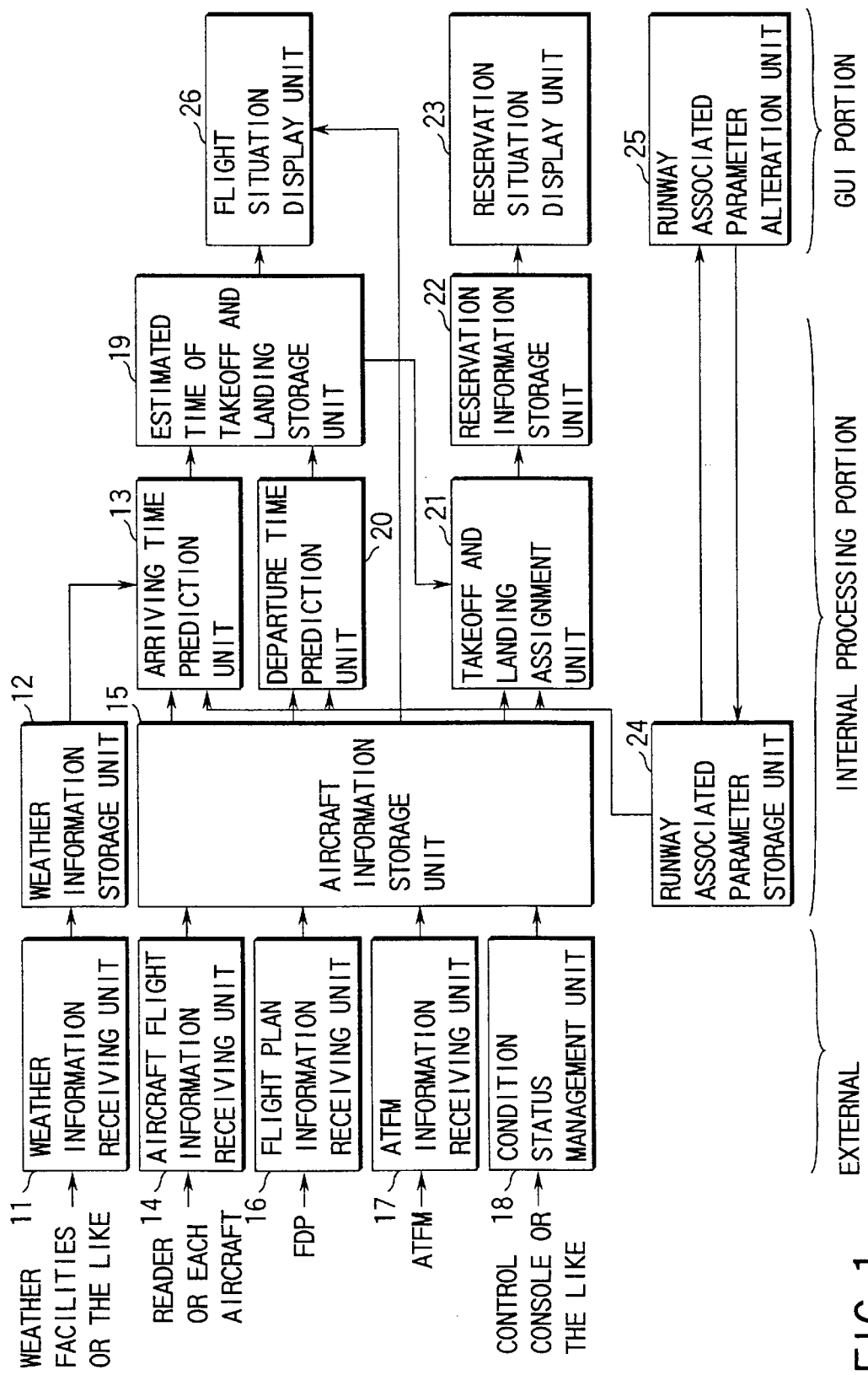
FIG. 1 is a block diagram showing the entire configuration of a runway reservation system according to an embodiment of the present invention.

Hereafter, an embodiment of the present invention will be described in detail by referring to the drawing.

FIG. 1 shows the entire configuration of a runway reservation system according to the present invention.

In FIG. 1, a weather information receiving unit 11 has conversion tables such as a wind direction and velocity table (area—wind direction and velocity) and a temperature table (area—temperature). From an external system (such as weather facilities) issuing the weather information in the approach control area, weather information is input to the weather information receiving unit 11. The weather information receiving unit 11 extracts the weather, information for example the wind direction and velocity information, and the temperature information, of each zone used in the present system, and outputs them to a weather information storage unit 12 as weather information.

The weather information storage unit 12 stores the weather information sent from the weather information receiving unit 11. According to a request from an arrival time prediction unit 13, the weather information storage unit 12 outputs the stored weather information to the arrival time prediction unit 13.

From aircraft flight information sent by each aircraft having a radar, an ADS (automatic dependent surveillance) or the like, an aircraft flight information receiving unit 14 takes out flight information, for example position and velocity information, of each aircraft to be used in the present system. (As for the aircraft flight information, it is acquired from radar information at the present time. In the future, however, a GPS (global positioning system) navigation apparatus will be mounted on each aircraft, and the aircraft flight information will be sent from each aircraft.) Then, the aircraft flight information receiving unit 14 outputs the flight information, for example position and velocity information of each aircraft to an aircraft information storage unit 15 as a part of arriving aircraft information and departing aircraft information. The arriving aircraft information includes the ACID (aircraft identification), EACT (expected approach consent time), aircraft position, aircraft velocity, aircraft type, wake turbulence classification, spot number, and arriving aircraft condition status (such as en route, approach (15 minutes, until arrival 10 minutes until arrival, 5 minutes until arrival), or tower). The departing aircraft information includes the ACID, EOBT (estimated time of movement start), restricted control matters, EDCT (estimated departure control time), aircraft position, SID (standard instrument departure), wake turbulence classification, spot number, and departing aircraft condition status (such as before pushback, in the middle of pushback, in the middle of taxiing, or in the middle of approach to a runaway).

From a flight plan sent from a FDP (flight data processing system), a flight plan information receiving unit 16 takes out the arriving and departing aircraft information, for example, the ACID, EACT, EOBT, restricted control matters, SID, aircraft type, wake turbulence classification, and spot number to be used in the present system. Then the flight plan information receiving unit 16 outputs them to the aircraft information storage unit 15 as a part of the above described arriving aircraft and departing aircraft information.

From information sent from a flow control center, an ATFM information receiving unit 17 takes out the departing aircraft information, for example the EDCT information, to be used in the present system, and outputs them to the aircraft information storage unit 15 as a part of the above described departing aircraft information.

On the basis of contents of control instructions sent from an external control console or the like, a condition status management unit 18 determines whether there is a subject of control in each of arriving aircraft and departing aircraft, and judges the state. The condition status management unit 18 outputs the result of the determination (condition status of the arriving aircraft and the departing aircraft) to the aircraft information storage unit 15 as a part of the above described arriving aircraft and departing aircraft information.

From the aircraft information storage unit 15, the arrival time prediction unit 13 reads out the arriving aircraft information, for example the aircraft position, aircraft velocity, and aircraft type, of each of the aircraft expected to arrive to the terminal control as determined by the arriving aircraft condition status. The arrival time prediction unit 13 calculates the estimated time of arrival (ETA) of each of aircraft expected to arrive, from these kinds of information at fixed time intervals, and outputs the estimated time of arrival information to a estimated takeoff and landing time storage unit 19.

From the aircraft information storage unit 15, a departure time prediction unit 20 is inputted with the departing aircraft information, for example, the EOBT, EDCT, restricted control matters, aircraft position, spot number, in the departing aircraft information of each of aircraft expected to depart subject to the tower control as determined by the departing aircraft condition status. Besides them, the departure time prediction unit 20 is inputted with information of a pushback time table, taxi time table, inner taxi velocity, outer taxi velocity, and turn taxi velocity from a runway associated parameter management unit. The departure time prediction unit 20 calculates the estimated time of departure (ETD) of each of aircraft expected to depart, from these kinds of information at fixed time intervals, and outputs the estimated time of departure information to the estimated takeoff and landing time storage unit 19.

As for the method for calculating the estimated time of departure, the state of the departing aircraft (such as before pushback, in pushback, taxiing, approaching to runway) is judged on the basis of the departing aircraft condition status, and calculation is carried out by using a method corresponding to the state of the departing aircraft.

The estimated takeoff and landing time storage unit 19 stores information of the estimated time of arrival and the estimated time of departure sent from the arrival time prediction unit 13 and the departure time prediction unit 20. According to a request issued by a takeoff and landing assigning unit 21, the estimated takeoff and landing time storage unit 19 outputs the stored information to the takeoff and landing assigning unit 21.

From the estimated takeoff and landing time storage unit 19, the takeoff and landing assigning unit 21 is inputted with the estimated time of arrival (ETA) and the estimated time of departure (ETD) of each of the arriving aircraft and departing aircraft to be subject to the terminal control and the tower control. In addition, the takeoff and landing assigning unit 21 is also inputted with restricted control matters and wake turbulence classification included in the arriving aircraft and departing aircraft information from the aircraft information storage unit 15. The takeoff and landing assigning unit 21 is also inputted with controllable range table information from the runway associated parameter management unit. The takeoff and landing assigning unit 21 assigns runway use time to each of the arriving aircraft and departing aircraft at fixed time intervals, and outputs results to a reservation information storage unit 22 as runway reservation information.

The assignment of the runway use time is conducted by selecting such a takeoff and landing sequence pattern so as to minimize the sum total of delays of arriving aircraft (and, if the sum totals of delays of arriving aircraft are the same, so as to minimize the sum total of delays of arriving aircraft and departing aircraft). Together with the wake turbulence classification information, the takeoff and landing assigning unit 21 outputs the estimated arrival and departure time of the arriving and departing aircraft to the reservation information storage unit 22 as runway reservation information (ACID, arriving aircraft and departing aircraft identification status, arrival or departure reservation information).

A reservation situation display unit 23 is inputted with runway reservation information from the reservation information storage unit 22, and displays the assignment situation of the runway use time of each of the arriving aircraft and departing aircraft on the screen together with the passage time on runway and various kinds of restriction information concerning the control (such as information of constraint by the wake turbulence area portion and constraint information concerning the lowest spacing).

A runway associated parameter management unit 24 stores parameter information, controllable range table (arriving aircraft condition status—possible advance or delay time), pushback time table (spot number—pushback time), taxi time table (spot number—taxi time), average runway approach time, inner taxi velocity, outer taxi velocity, and turn taxi velocity which were set for each of runways used in the present system. The runway associated parameter management unit 24 outputs the parameter information to the arrival time prediction unit 13, the departure time prediction unit 20, and the takeoff and landing assigning unit 21.

A runway associated parameter alteration unit 25 is inputted with the runway associated parameter information from the runway associated parameter storage unit 24. The runway associated parameter alteration unit 25 alters parameters on the screen, and outputs the altered parameter information to the runway associated parameter storage unit 24. In addition, when a runway change instruction is given on the screen, the runway associated parameter alteration unit 25 outputs the instruction to the runway associated parameter storage unit 24.

A flight situation display unit 26 is inputted with the estimated arrival time and estimated departure time information from the estimated takeoff and landing time storage unit 19. In addition, the flight situation display unit 26 is inputted with arriving aircraft information and departing aircraft information as well from the aircraft information storage unit 15. On the basis of those kinds of information, the flight situation display unit 26 displays each of arriving and departing aircraft in the position of the estimated arrival/departure time on the time axis. Together therewith, the flight situation display unit 26 displays other arriving and department aircraft information, such as the aircraft identification code (ACID), spot number, wake turbulence classification, SID (standard instrument departure), on the screen.

Here, the weather information receiving unit 11, the aircraft flight information receiving unit 14, the flight plan information receiving unit 16, the ATFM information receiving unit 17, and the condition status management unit 18 function as an external interface unit. The weather information storage unit 12, arrival time prediction unit 13, aircraft information storage unit 15, estimated takeoff and landing time storage unit 19, departure time prediction unit 20, takeoff and landing assignment unit 21, runway associated parameter storage unit 24, and reservation information storage unit 22 function as an internal processing unit. The reservation situation display unit 23, runway associated parameter alteration unit 25, and flight situation display unit 26 function as a GUI unit.

Hereafter, characteristic operations of the above described configuration will be described.

Figure 2:
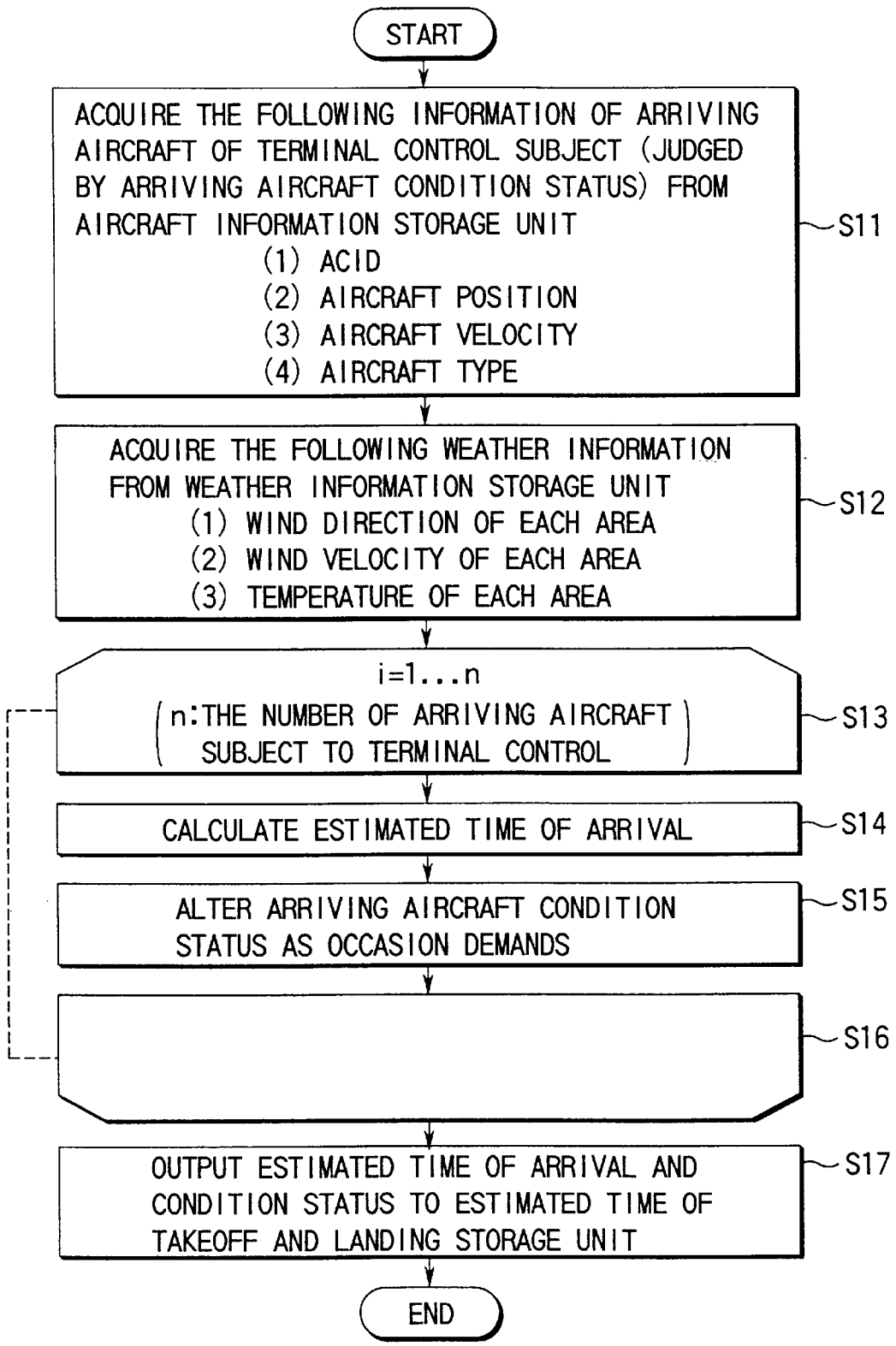
FIG. 2 is a flow chart showing the processing procedure of an arrival time prediction unit in the embodiment.

FIG. 2 shows the processing procedure of the arrival time prediction unit 13. First of all, in initialization, the arrival time prediction unit 13 acquires the arriving aircraft information of the ACID, aircraft position, velocity, and type in the arriving aircraft to be subject to the terminal control (determined by the arriving aircraft condition status) from the aircraft information storage unit 15 (S11). Thereafter, the arrival time prediction unit 13 acquires the weather information of the wind direction, wind velocity, and temperature of each area (S12).

In succession, with respect to the number n of arriving aircraft to be subject to the terminal control, the arrival time prediction unit 13 selects an ith (where i=1, . . . , n) arriving aircraft (S13), calculates the estimated time of arrival (ETA) (S14), alters the arriving aircraft condition status as occasion demands (S15), and causes the steps S13 to S15 to be repetitively executed so as to conduct processing on all arriving aircraft to be subject to the terminal control (S16). If the processing for all arriving aircraft has been completed, then the arrival time prediction unit 13 outputs the estimated arrival time to the estimated takeoff and landing time storage unit 19 together with the condition status (S17).

The estimated time of arrival (ETA) thus obtained is stored in the estimated takeoff and landing time storage unit 19, and suitably displayed on the flight situation display unit 26.

Figure 3:
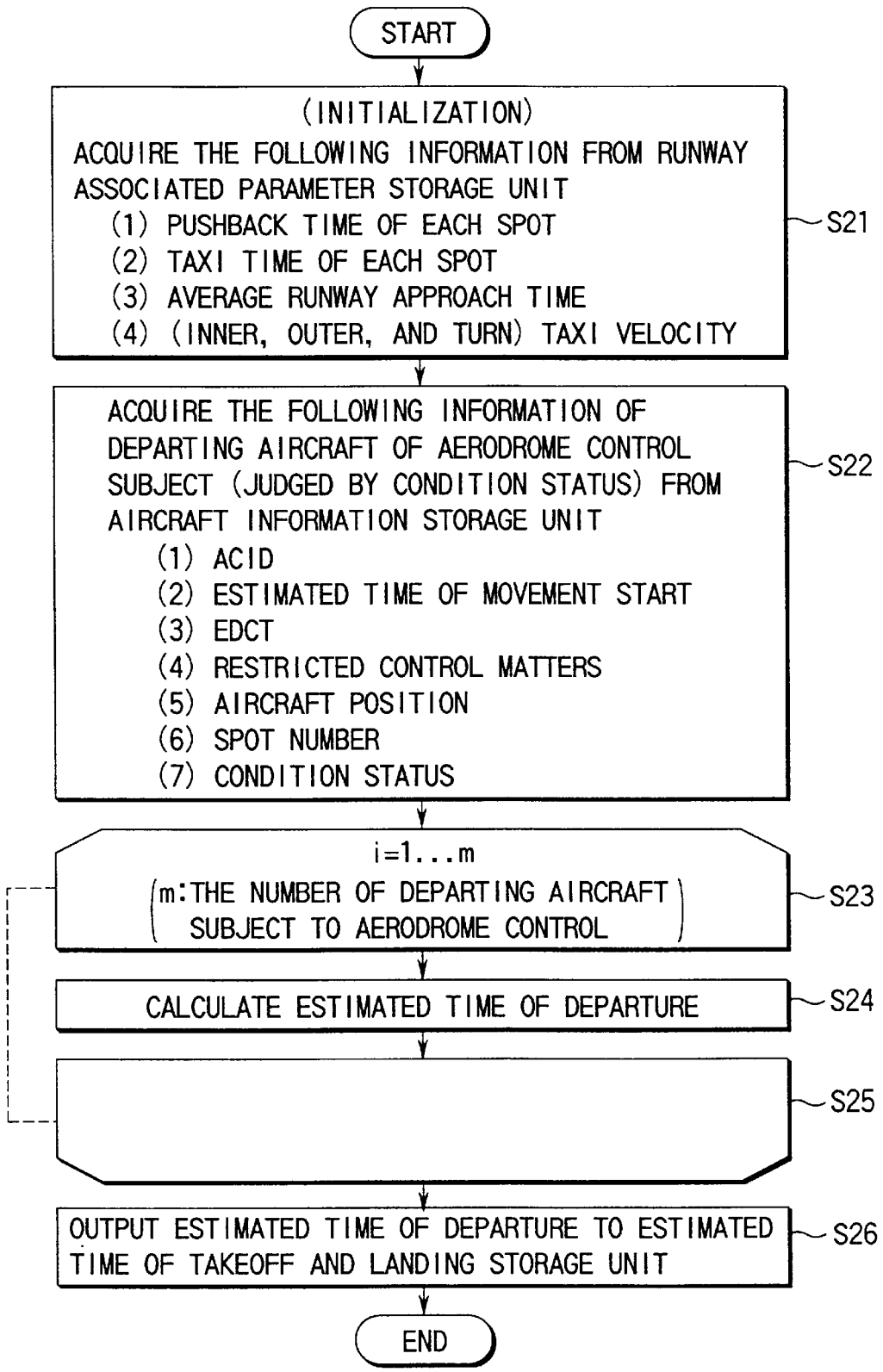
FIG. 3 is a flow chart showing the processing procedure of a departure time prediction unit in the embodiment.

FIG. 3 shows the processing procedure of the departure time prediction unit 20. First of all, in initialization, the departure time prediction unit 20 acquires system parameter information of the pushback time of each spot, taxi time of each spot, average runway approach time, inner taxi velocity, outer taxi velocity, and turn taxi velocity from the runway associated parameter storage unit 24 (S21), and acquires the ACID, estimated time of moving start, EDCT, restricted control matters, aircraft position, and spot number of the arriving aircraft to be subject to the tower control (determined on the basis of the departing aircraft condition status) from the aircraft information storage unit 15 (S22).

In succession, with respect to the number m of departing aircraft to be subject to the terminal control, the departure time prediction unit 20 selects an ith (where i=1, . . . , n) departing aircraft (S23), calculates the estimated time of departure (ETD) (S24), and causes the steps S23 and S24 to be repetitively executed so as to conduct processing on all departing aircraft to be subject to the tower control (S25). If the processing for all departing aircraft has been completed, then the departure time prediction unit 20 outputs the estimated departure time to the estimated takeoff and landing time storage unit 19 (S18).

The estimated time of departure (ETD) thus obtained is stored in the estimated takeoff and landing time storage unit 19, and suitably displayed on the flight situation display unit 26.

Figure 4:
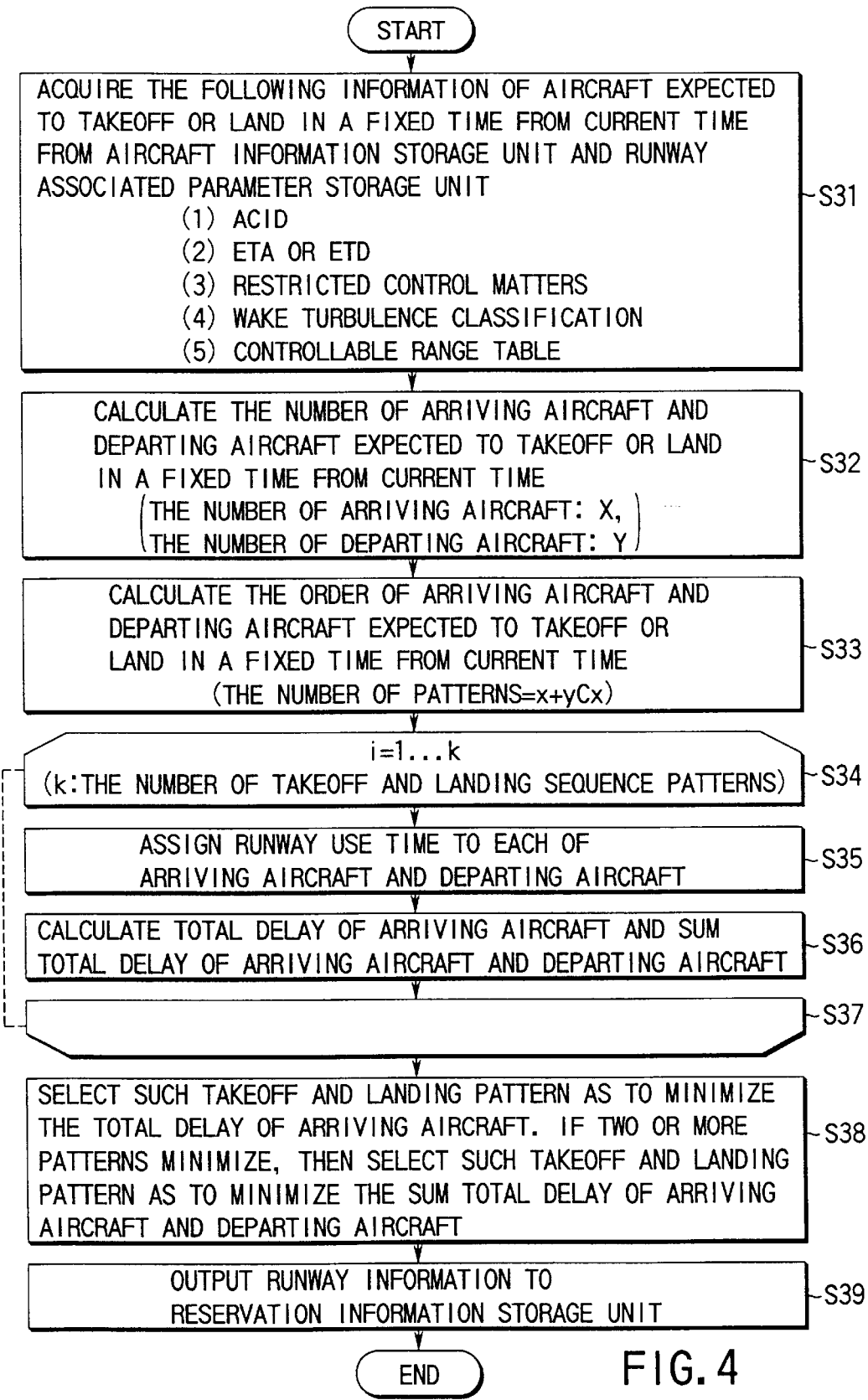
FIG. 4 is a flow chart showing the processing procedure of a taking off and landing assigning unit in the embodiment.

FIG. 4 shows the processing procedure of the takeoff and landing assignment unit 31. First of all, the takeoff and landing assignment unit 21 acquires the aircraft information and condition status information of the ACID, ETA or ETD, restricted control matters, wake turbulence classification, and controllable range table in the arriving and departing aircraft expected to land and takeoff for a fixed time period from the current time from the aircraft information storage unit 15, the estimated takeoff and landing time storage unit 19, and the runway associated parameter storage unit 24 (S31). The takeoff and landing assignment unit 21 calculates the number X of arriving aircraft and the number Y of departing aircraft expected to land and takeoff for a fixed time period from the current time (S32). Thereafter, the takeoff and landing assignment unit 21 calculates takeoff and landing sequence patterns for a fixed time period from the current time (S33). Here, the number of patterns is $_{x+y}C_x$, which indicates the number of combinations of choosing x elements out of (x+y) elements.

In succession, with respect to the number k of takeoff and landing sequence patterns, the takeoff and landing assignment unit 21 selects an ith (where i=1, . . . , k) pattern (S34), assigns runway use time to each of arriving and departing aircraft (S35), calculates the total delay of arriving aircraft and the total delay of arriving and departing aircraft (S36), and causes the steps S34 to S36 to be repetitively executed so as to conduct processing on all takeoff and landing sequence patterns (S37). If the processing has been completed for all patterns, then the takeoff and landing assignment unit 21 selects such a takeoff and landing sequence pattern as to minimize the sum of delays of arriving aircraft, and assigns corresponding aircraft (S38). In the case where equal sums of delays of arriving aircraft are minimum, such a takeoff and landing sequence pattern as to minimize the sum of delays of arriving aircraft and departing aircraft is selected The runway reservation information thus assigned is stored in the reservation information storage unit 22, and suitably displayed in the reservation situation display unit 23.

By utilizing the runway reservation system having the above described configuration, therefore, it is possible to predict the takeoff and landing time of arriving and departing aircraft, assign runway use time to each of the arriving and departing aircraft so as to exhibit the processing capability of the airport at its maximum, display the assignment information of the runway use time in a form that the controller can easily grasp, and share this information between the terminal control and the aerodrome control. As a result, therefore, the control service load concerning the takeoff and landing adjustment can be significantly reduced.

(Embodiments)

Hereafter, an estimated departure time calculation method and a takeoff and landing assigning method featuring the present invention will be described by referring to concrete examples.

(Estimated departure time calculation method)

As for the calculation of the estimated time of departure, the current condition of the aircraft is judged on the basis of the aircraft position and contents of control instructions, and the estimated time of departure is calculated by using a calculation method corresponding to the current condition of the aircraft.

Denoting pushback time corresponding to spot number by a, taxi time corresponding to spot number by b, average runway approach time by c, the current position of the aircraft obtained from the ADS or the like by d, and a taxi velocity at the time of inner passage, outer passage, or the like by e, the effective EOBT+a+b+c is derived before pushback approval. After the pushback approval, the pushback start time+a+b+c is derived. After taxi approval, the current time+(taxi time calculated from d and e)+c is calculated. After runway approach approval, the runway approach start time+c is derived.

(Estimated arrival time calculation method)

As for the calculation of the estimated time of arrival (landing), the estimated time of arrival is calculated on the basis of the arriving aircraft information such as (1) the position and velocity of the arriving aircraft obtained from the ADS or the like, (2) characteristics of the aircraft (such as a function of altitude and velocity), (3) flight route instructed by the control (such as ATAR), flight route instructed by the control (such as STAR), and (4) wind direction and velocity, and the temperature.

(Takeoff and landing assigning method)

Setting of the estimated time of takeoff and landing will now be described.

First of all, in the initial time slot assignment, the following estimated time of landing and estimated time of takeoff are used.

Estimated Time of Landing

The estimated time of arrival (ETA) of the aircraft information sent from the FDP is used.

Estimated Time of Takeoff

The estimated time of takeoff is defined as the effective EOBT+pushback time+taxi time+average runway approach time. Here, the effective EOBT refers to the EOBT which reflects departure limiting matters (such as clearance release time, and clearance void time (VIFNO)) inputted from the ACC (area control center) and the EDCT inputted from the ATFM. As for the pushback time the and taxi time, average time actually measured beforehand so as to correspond to the spot number is used. (Time information in a table form is used.) The limiting matters on the control, include runway passage time, minimum spacing, minimum spacing between the same SID, and minimum spacing due to the wake turbulence classification.

Runway Passage Time

Runway passage time refers to a physical time for the aircraft to pass over the runway. In the Tokyo International Airport, the following actual result values (of B747 plane) are used.

Arriving aircraft: 1 minute (from runway approach end passage to separation from runway)

Departing aircraft: 1.3 minute (from start of takeoff to runway end passage)

Minimum Spacing

From grounds as described in the following (a) to (d), the minimum spacing between a preceding aircraft and a succeeding aircraft becomes a value shown in the following table.

TABLE 1

| Case | Preceding aircraft | Succeeding aircraft | Minimum spacing | Foundation of minimum spacing |
|---|---|---|---|---|
| 1 | Arriving aircraft | Departing aircraft | 1 minute | See (c) |
| 2 | | Arriving aircraft | 2 minutes | See (a) |
| 3 | Departing aircraft | Departing aircraft | 2 minutes, 3 minutes | See (b) |
| 4 | | Arriving aircraft | 2, 3 minutes | See (a) |

(a) Minimum spacing required for issuance of landing clearance (in the case of cases 2 and 4)

"A landing clearance is issued by making sure that there is no preceding aircraft in the range from the runway approach end to 2 NM (see FIG. 5)." If the succeeding aircraft is an arriving aircraft, such spacing with respect to the preceding aircraft as to correspond to this Control System Standard is needed.

By taking the Tokyo International Airport as an example and using the actual result average value of the final approach velocity of the arriving aircraft equivalent to 132 knots, the 2 NM is converted into time of approximately 1 minute. If the preceding aircraft is a departing aircraft, then the runway passage time 1.3 minute of the departing aircraft is added to this 1 minute, and the minimum spacing of 2.3 minutes is thus obtained. If the preceding aircraft is an arriving aircraft, then the runway passage time 1 minute of the departing aircraft is added to this 1 minute, and the minimum spacing of 2 minutes is thus obtained.

(b) Minimum spacing between departing aircraft with the velocity difference between the preceding aircraft and the succeeding aircraft reflected (in the case of case 3)

According to the initial spacing between departing aircraft of the Control System Standards, the actual result value (2 minutes or 3 minutes) in the Tokyo International Airport as shown in the following TABLE is adopted.

TABLE 2

| Preceding aircraft | Succeeding aircraft | Minimum spacing |
|---|---|---|
| Heavy | Heavy | 2 minutes |
|  | Medium | 2 minutes |
|  | Light | 2 minutes |
| Medium | Heavy | 3 minutes |
|  | Medium | 2 minutes |
|  | Light | 2 minutes |
| Light | Heavy | 3 minutes |
|  | Medium | 3 minutes |
|  | Light | 2 minutes |

In the Tokyo International Airport, the minimum spacing between departing aircraft is set equal to 3 minutes on the basis of the velocity difference between the preceding aircraft and the succeeding aircraft, in the case where the succeeding aircraft is faster in velocity than the preceding aircraft (i.e., the succeeding aircraft is larger in wake turbulence classification than the preceding aircraft). In the case where the succeeding aircraft is slower in velocity than or equal to the preceding aircraft (i.e., the succeeding aircraft is smaller in wake turbulence classification than or equal to the preceding aircraft), service is conducted by setting the minimum spacing between departing aircraft equal to 2 minutes.

(c) Minimum spacing between arriving aircraft (preceding aircraft) and departing aircraft (succeeding aircraft) (in the case of case 1)

While the arriving aircraft is landing and leaving the runway, the succeeding aircraft, i.e., the departing aircraft can complete its approach to the runway and begin its takeoff immediately after the arriving aircraft has left. Therefore, the minimum spacing is set equal to 1 minute which is the runway passage time of the arriving aircraft.
Minimum Spacing Between Departing Aircraft in Same SID According to the initial spacing between departing aircraft of the Control System Standards, minimum spacing is set to 5 minutes if the height succeeding aircraft is same or lower, minimum spacing is set to 3 minutes if the height succeeding aircraft is higher.
Minimum Spacing According to Wake Turbulence Classification In accordance with the Control System Standards, the minimum spacing between arriving aircraft is set as shown in the following TABLE.

TABLE 3

| Preceding aircraft | Succeeding aircraft | Minimum spacing |
|---|---|---|
| Heavy | Heavy | 2 minutes |
| Heavy | Medium | 2 minutes |
| Heavy | Light | 2 minutes |
| Medium |  |  |

In accordance with the Control System Standards, the minimum spacing between departing aircraft is set as shown in the following TABLE.

TABLE 4

| Preceding aircraft | Succeeding aircraft | Minimum spacing | Remark |
|---|---|---|---|
| Heavy | Heavy | 2 minutes | The value in ( ) is |
| Heavy | Medium | 2 minutes | a value in the case |
|  |  | (3 minutes) | where the succeeding |
| Heavy | Light | 2 minutes | aircraft conducts |
|  |  | (3 minutes) | intersection takeoff. |

A guide to takeoff and landing time slot assignment will now be described.

In the case where one runway is used for both takeoff and landing, assignment of takeoff and landing time slots is conducted on the following principles.

(1) On the basis of the estimated time of takeoff and the estimated time of landing, the number of departing aircraft and arriving aircraft in a certain fixed time is calculated, and a plurality of takeoff and landing pattern candidates are set. For example, denoting an arriving aircraft by A and a departing aircraft by D, the takeoff and landing patterns for two departing aircraft and two arriving aircraft are the following six patterns:

A-A-D-D

A-D-A-D

A-D-D-A

D-A-A-D

D-A-D-A

D-D-A-A (2) On the basis of the required spacing between the preceding arriving aircraft determined from the above described restriction matters on the control and shown in the following TABLE, the takeoff and landing time in the takeoff and landing patterns set in (1) is set.

TABLE 5

| Takeoff and landing pattern | | Necessary spacing (minute) | Remarks |
|---|---|---|---|
| A-A | A(H)-A(L) A(M)-A(L) | 3 | In the case where the succeeding aircraft is L and the preceding aircraft is higher than L (H or M) |
|  | Rest | 2 | In cases other than the above described case |

TABLE 5-continued

| Takeoff and landing pattern | | Necessary spacing (minute) | Remarks |
|---|---|---|---|
| D-D | D(H)-D(H)<br>D(M)-D(M)<br>D(M)-D(L)<br>D(L)-D(L) | 2 | In the case where the succeeding aircraft is equal in velocity to or smaller in velocity than the preceding aircraft (i.e., in the case where the succeeding aircraft is equal in wake turbulence classification to or smaller in wake turbulence classification than the preceding aircraft) |
| | D(H)-D(M)<br>D(H)-D(L) | 2(3) | Ditto. (The value in ( ) is a value in the case where the succeeding conducts intersection takeoff) |
| | D(M)-D(H)<br>D(L)-D(H)<br>D(L)-D(M) | 3 | In the case where the succeeding aircraft is larger in velocity than the preceding aircraft (i.e., in the case where the succeeding aircraft is larger in wake turbulence classification than the preceding aircraft) |
| A-D | — | 1 | |
| D-A | — | 2, 3 | |

Remark
1. D and A denote departing aircraft and arriving aircraft, respectively.
2. H, M, and L ( ) indicate that the wake turbulence classification is heavy, medium, and light, respectively.

(3) Adjustments are conducted according to the allowed advance and delay time of the arriving aircraft and departing aircraft.

(4) Such a pattern as to minimize the delay of the arriving aircraft is selected. (In the case where delays of the arriving aircraft are the same, such a pattern as to minimize the total delay of the arriving aircraft and the departing aircraft is selected.)

In the takeoff and landing assignment method, the estimated takeoff and landing time may be recalculated at fixed time intervals after the initial assignment. If reassignment of runway use time is conducted only when an aircraft which has got out of the allowed delay an advance range, the processing range can be reduced.

(Example of runway reservation situation display)

Figure 6A:
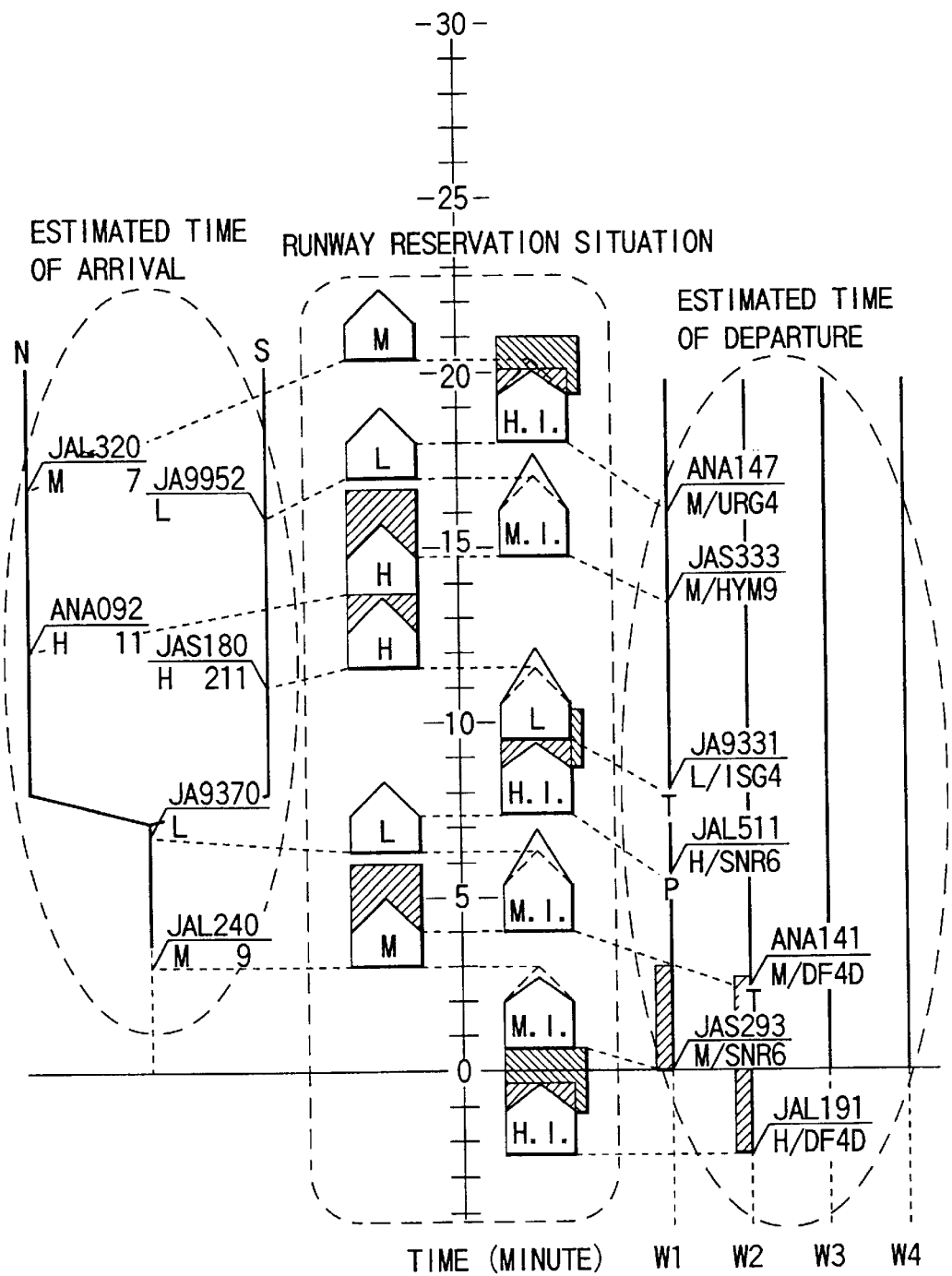
FIG. 6A is a diagram showing an example of data displayed on a display screen, indicating the runways which have been reserved.

FIGS. 6A to 6C show an example of a display screen of runway reservation situation compiled on the basis of the processing result heretofore described. FIG. 6A shows contents of the display. FIG. 6B shows an example of a symbol representing an aircraft on the display screen. FIG. 6C shows an example of marking of the minimum spacing depending upon the wake turbulence classification.

In this display example, the estimated time of arrival, the runway reservation situation, and the estimated time of departure are displayed together with the ACID, the wake turbulence classification, and the minimum spacing of this classification. By the display contents, the controller can understand current positions of aircraft, and runway reservation time of each of the departing aircraft and arriving aircraft at a glance. In addition, the terminal control and the aerodrome control can share this information. By optimum reservation setting, therefore, the processing capability of the airport can be fully used. The control service load concerning the takeoff and landing adjustment can be significantly reduced.

In the description of the embodiment heretofore given, actual result values in the Tokyo International Airport are partly used. By suitably setting various conditions, however, the embodiment can be applied to all airports using one runway for both takeoff and landing. By suitably setting various conditions in the same way, the embodiment can also be applied to airports each having a plurality of runways.

As heretofore described, the present invention makes it possible to provide a runway reservation system capable of predicting the takeoff and landing time of arriving and departing aircraft, assigning runway use time to each of the arriving and departing aircraft so as to exhibit the processing capability of the airport at its maximum, displaying the assignment information of the runway use time in such a form that the controller can easily grasp, and sharing this information between the terminal control and the aerodrome control, thereby exhibiting the processing capability of the airport at its maximum, and significantly reducing the control service load concerning the takeoff and landing adjustment.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A runway reservation system for assigning runway use time to each arriving and departing aircraft and supporting terminal control and aerodrome control service, comprising:

information acquiring means for acquiring aerodrome information and weather information of said arriving and departing aircraft;

arrival time prediction means for predicting arrival time of said arriving aircraft based on information acquired by said information acquiring means;

departure time prediction means for predicting departure time of said departing aircraft based on the information acquired by said information acquiring means;

runway use time assignment means for automatically assigning runway use time to each of said arriving and departing aircraft most efficiently under restrictions on control based on the information acquired by said information acquiring means, wherein the information acquired by said information acquiring means is automatically inputted to said runway use time assignment means;

flight situation display means for displaying estimated time of arrival/departure of each of said arriving and departing aircraft predicted by said arrival time prediction means and said departure time prediction means; and reservation situation display means for displaying a situation of runway assignment assigned by said runway use time assignment means.

2. A runway reservation system according to claim 1, wherein said arrival time prediction means calculates the arrival time of each arriving aircraft from position, velocity and flight characteristics of each of the arriving aircraft and weather information containing wind direction and velocity and temperature in a control area.

3. A runway reservation system according to claim 1, wherein said departure time prediction means calculates departure time of each departing aircraft based on pushback time corresponding to a spot position, an actual result time of taxi time, and an actual result value of approach time to the runway.

4. A runway reservation system according to claim 1, wherein said departure time prediction means calculates estimated time of departure each of departing aircraft in taxiing based on at least a position, an estimated route of taxi, and actual result values of outer taxi velocity and inner taxi velocity of each of departing aircraft in taxiing.

5. A runway reservation system according to claim 1, wherein said runway use time assignment means assigns runway use time to each of the arriving and departing aircraft according to Control System Standards.

6. A runway reservation system according to claim 1, wherein said runway use time assignment means assigns runway use time to each of the arriving and departing aircraft so as to minimize a sum total of delays of the arriving aircraft.

7. A runway reservation system according to claim 1, wherein in case where there are a plurality of runway use time assignment patterns minimizing a sum total of delays of the arriving aircraft, said runway use time assignment means assigns runway use time to each of the arriving and departing aircraft so as to minimize a sum total of delays of the arriving and departing aircraft.

8. A runway reservation system according to claim 1, wherein said runway use time assignment means assigns runway use time to each arriving aircraft within an allowed delay/advance range of each arriving aircraft.

9. A runway reservation system according to claim 1, wherein said runway use time assignment means assigns runway use time to each departing aircraft within an allowed delay range of each departing aircraft.

10. A runway reservation system according to claim 1, wherein said runway use time assignment means conducts reassignment of runway use time when runway time assigned to an arriving/departing aircraft has got out of an allowed delay/advance range of each of the arriving and departing aircraft.

11. A runway reservation system according to claim 1, wherein for a departing aircraft having a time restriction such as clearance release time and clearance void time, said runway use time assignment means assigns runway use time within the time restriction.

12. A runway reservation system according to claim 1, wherein said runway use time assignment means is capable of conducting, on a screen, cancellation of assignment of aircraft judged to be incapable of an taking off and landing as assigned, and while reflecting this, said runway use time assignment means newly conducts reassignment of runway use time.

13. A runway reservation system according to claim 1, wherein said reservation situation display means displays runway use time assigned to each of the arriving aircraft and departing aircraft on a time axis together with a passage time on the runway and restricted matters on the control.

14. A runway reservation system according to claim 1, wherein said flight situation display means displays an aircraft identification code (ACID) of each of the arriving and departing aircraft in a position of estimated time of departure/arrival on a time axis together with at least one of spot number, wake turbulence classification, and SID (standard instrument departure).

15. A runway reservation system according to claim 1, further comprising runway associated parameter alteration means capable of giving runway change instructions on a screen, various parameters associated with the runway which have changed in accordance with the runway change instructions being automatically set in said runway associated parameter alteration means.

16. A runway reservation system according to claim 15, wherein said runway associated parameter alteration means gives runway change instructions on the screen together with a situation display before and after the runway change and a display of time when the runway change is possible.

17. A runway reservation system for assigning runway use time to each arriving and departing aircraft and supporting terminal control and aerodrome control service, comprising:

a weather information receiving unit for acquiring weather information from an external system issuing weather information in an approach area, the weather information receiving unit selectively taking out necessary information;

a weather information storage unit for storing weather information acquired by the weather information receiving unit and outputting pertinent weather information according to a first request;

aircraft flight information receiving unit for selectively taking necessary information out of aircraft flight information sent from a radar or an aircraft;

a flight plan information receiving unit for selectively taking out information including arriving aircraft information, estimated time of arrival, estimated time of movement start, restricted control matters, standard instrument departure procedure, aircraft type, wake turbulence classification, and spot number from a flight plan sent from a FDP;

an air traffic flow management (ATFM) information receiving unit for selectively taking out necessary information from a flow control center;

a condition status management unit for determining whether each of the arriving and departing aircraft is a subject of control and judging a state of each of the arriving and departing aircraft based on contents of control instructions sent from an external control apparatus, and acquiring a condition status of each of the arriving and departing aircraft as a part of arriving and departing aircraft information;

an aircraft information storage unit for storing, as a part of the arriving and departing aircraft information, information acquired in said aircraft flight information receiving unit, said flight plan information receiving unit, said ATFM information receiving unit, and said condition status management unit, and outputting pertinent information according to a second request;

an arriving time prediction unit for predicting arrival time of each arriving aircraft based on information stored in said weather information storage unit and said aircraft information storage unit, and outputting information of estimated time of arrival;

a departure time prediction unit for predicting departure time of each departing aircraft based on information stored in said aircraft information storage unit and outputting information of estimated time of departure;

an estimated time of takeoff and landing storage unit for storing information of the estimated time of arrival and estimated time of departure respectively output from said arrival time prediction unit and said departure time prediction unit, and outputting pertinent information according to a third request;

a takeoff and landing assignment unit automatically inputted with aircraft information of arriving aircraft and departing aircraft from said aircraft information storage unit and automatically inputted with information of the estimated time of arrival and estimated time of departure from said estimated time of takeoff and landing storage unit, to automatically assign runway use time to each of the arriving aircraft and departing aircraft in accordance with Control System Standards, and output a result of assignment as runway reservation information;

a reservation information storage unit for storing runway reservation information output from said takeoff and landing assignment unit, and outputting pertinent information according to a fourth request;

a flight situation display unit inputted with the estimated time of arrival and the estimated time of departure from said estimated time of takeoff and landing storage unit and inputted with pertinent aircraft information of arriving aircraft and departing aircraft from said aircraft information storage unit to display the aircraft information on a screen;

a reservation situation display unit inputted with runway reservation information from said reservation information storage unit to display the runway reservation information on the screen;

an runway associated parameter storage unit for storing parameter information set before for each runway, and outputting the parameter information to said arrival time prediction unit, said departure time prediction unit, and said takeoff and landing assignment unit; and a runway associated parameter alteration unit inputted with runway associated parameter information from said runway associated parameter storage unit, to alter parameters on the screen, output altered parameter information to said runway associated parameter storage unit, and output runway change instruction given on the screen to said runway associated parameter storage unit.

18. A runway reservation system according to claim 17, wherein said arrival time prediction unit has:

a first procedure for calculating estimated time of arrival from the arriving aircraft information and runway associated parameter information of each arriving aircraft subject to terminal control; and a second procedure for outputting said estimated time of arrival to said estimated time of takeoff and landing storage unit, and thereafter, said first procedure and said second procedure are repeated until control processing is finished.

19. A runway reservation system according to claim 17, wherein said departure time prediction unit has:

a first procedure for calculating estimated time of departure from the departing aircraft information and runway associated parameter information of each departing aircraft subject to tower control; and a second procedure for outputting said estimated time of departure to said estimated time of takeoff and landing storage unit, and thereafter, said first procedure and said second procedure are repeated until control processing is finished.

20. A runway reservation system according to claim 17, wherein said takeoff and landing assignment unit has:

a first procedure for deriving a number of aircraft expected to arrive within a predetermined time and aircraft expected to depart within the predetermined time;

a second procedure for deriving takeoff and landing sequence patterns from the number of arriving aircraft and departing aircraft derived by said first procedure;

a third procedure for assigning runway use time to each of the arriving aircraft and departing aircraft in each of the takeoff and landing sequence patterns derived by said second procedure;

a fourth procedure for deriving a delay time of takeoff and landing from runway use time assigned in each of the takeoff and landing sequence patterns derived by said third procedure, and determining a takeoff and landing sequence pattern; and a fifth procedure for outputting the runway use time of each of the arriving aircraft and departing aircraft in the takeoff and landing sequence pattern determined by said fourth procedure to said reservation information storage unit as runway reservation information, and thereafter, said first to fifth procedures are repeated until control processing is finished.

* * * * *